(12) United States Patent
Lee

(10) Patent No.: US 8,733,715 B2
(45) Date of Patent: May 27, 2014

(54) SKI BOAT PYLON MOUNT

(75) Inventor: Michael F. Lee, Windermere, FL (US)

(73) Assignee: High Gear Specialties, inc., Winter Garden, FL (US)

( * ) Notice: Subject to any disclaimer, the term of this patent is extended or adjusted under 35 U.S.C. 154(b) by 55 days.

(21) Appl. No.: 13/524,606

(22) Filed: Jun. 15, 2012

(65) Prior Publication Data

US 2013/0334386 A1    Dec. 19, 2013

(51) Int. Cl.
*A47G 1/10* (2006.01)
(52) U.S. Cl.
USPC .................. 248/183.2; 248/316.1; 248/177.1; 114/253; 396/428
(58) Field of Classification Search
USPC ................. 248/316.1, 177.1, 183.2; 396/428; 114/253; 440/34
See application file for complete search history.

(56) References Cited

U.S. PATENT DOCUMENTS

| | | | | |
|---|---|---|---|---|
| 1,509,068 | A * | 9/1924 | Herron | 248/181.1 |
| 5,000,109 | A * | 3/1991 | Anderson | 114/242 |
| 5,173,725 | A | 12/1992 | Giles et al. | |
| 5,190,256 | A * | 3/1993 | Macchiarella | 248/177.1 |
| 5,664,750 | A * | 9/1997 | Cohen | 248/231.71 |
| 5,694,337 | A * | 12/1997 | Macken | 700/91 |
| 5,788,133 | A * | 8/1998 | Mareno | 224/406 |
| 5,845,885 | A * | 12/1998 | Carnevali | 248/181.1 |
| 5,943,977 | A * | 8/1999 | Womack et al. | 114/242 |
| 6,119,617 | A * | 9/2000 | Oswell | 114/253 |
| 6,220,556 | B1 * | 4/2001 | Sohrt et al. | 248/279.1 |
| 7,013,823 | B1 * | 3/2006 | Daugherty | 114/253 |
| 8,137,008 | B1 * | 3/2012 | Mallano | 396/427 |
| 8,459,197 | B2 * | 6/2013 | Jordan | 114/253 |
| 2012/0152162 | A1 * | 6/2012 | Jordan | 114/253 |

* cited by examiner

*Primary Examiner* — Terrell McKinnon
*Assistant Examiner* — Daniel J Breslin
(74) *Attorney, Agent, or Firm* — GrayRobinson, P.A.

(57) ABSTRACT

An apparatus is provided for mounting a video recording device to the pylon of a ski boat such that the video recording device tracks the motion of the skier during a ski run in response to movement of the ski rope.

15 Claims, 9 Drawing Sheets

SKI BOAT PYLON MOUNT

FIELD OF THE INVENTION

This invention relates to water ski boats, and, more particularly, to an apparatus for mounting a video recording device to the pylon of a water ski boat so that the device tracks the movement of a skier while skiing.

BACKGROUND OF THE INVENTION

Water skiing is a popular activity both at the recreational and tournament levels. As is well known, the outboard or inboard motors of ski boats produce a wake which extends rearwardly from the stern of the boat for a number of feet. The skier grasps a ski rope attached to a pylon mounted to the boat and typically maneuvers in a side-to-side direction, back and forth across the wake, during a skiing run. The extent of side-to-side movement of the skier can vary significantly depending on the length of the ski rope, the skill of the skier, the type of activities being performed during a ski run and the like.

Many individuals have found it desirable to record their ski runs or those of others on video. Typically, a video camera or other video recording device is mounted in a fixed position to some part of the ski boat facing in a direction toward the stern of the boat. A wide angle lens is generally used in an attempt to maintain the skier in the frame of the video recording device as he or she maneuvers in the side-to-side direction. Very often the skier is visible for only part of the ski run, particularly when a longer ski rope is used. Alternatively, an individual located in the ski boat may attempt to record the ski run by manipulating the video recording device manually. The quality of the resulting video is completely dependent on the skill of the individual, and his or her ability to consistently maintain the skier centered in the frame of the video recording device.

SUMMARY OF THE INVENTION

This invention is directed to an apparatus for mounting a video recording device to the pylon of a ski boat such that the video recording device tracks the skier during a ski run in response to movement of the ski rope.

In the presently preferred embodiment, a pylon mount is pivotally attached to the pylon of a ski boat. The pylon mount is formed with a rope guide opening through which the ski rope, attached at one end to the pylon, is extended. As the skier moves in a side-to-side direction during a ski run, the ski rope engages the pylon mount and pivots it in the same direction as the motion of the skier.

A first coupler is attached to the pylon mount and a second coupler may be releasably connected to the first coupler. The second coupler may be a separate element, or form part of, a video device mount. The video device mount may comprise a cradle for supporting a smart phone or similar portable video recording device, or a camera mount capable of mounting a video camera. In either case, the video recording device is movable with the pylon mount and tracks the skier in response to movement of the ski rope.

The ski boat pylon mount of this invention provides a reliable, easy-to-use and effective alternative to prior attempts at video recording ski runs from a water ski boat. It mounts to an existing pylon on the boat, without any modification of the pylon, and can be used with smart phones, video cameras or other video recording devices. The pylon mount automatically aligns with and tracks the position of the skier, and does not require any participation from individuals in the ski boat other than to turn on the video recording device.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
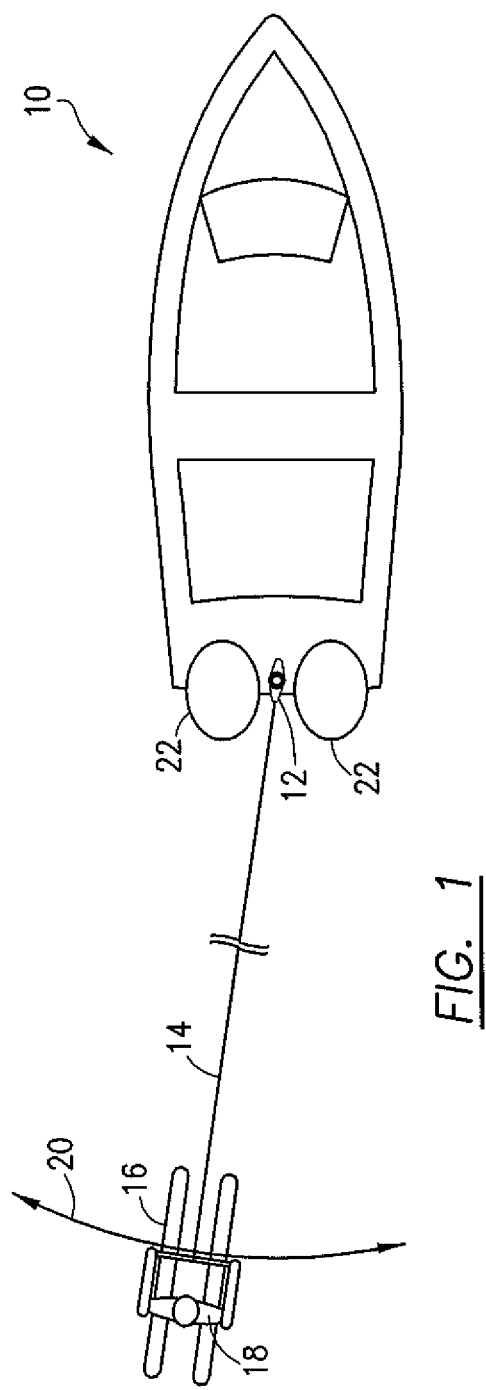
FIG. 1 is a diagrammatic, plan view of a water ski boat pulling a skier.

Referring initially to FIG. 1, a water ski boat 10 is schematically illustrated having a pylon 12 mounted to the stern. One end of a ski rope 14 is attached to the pylon 12, in a manner described in more detail below, and its opposite end connects to a handle 16 that may be grasped by a skier 18. Typically, the skier 18 moves in a side-to-side direction during a skiing run, illustrated generally by the arrow 20 in FIG. 1, crossing the wake (not shown) produced by the motor(s) 22 of the ski boat 10.

Figure 2:
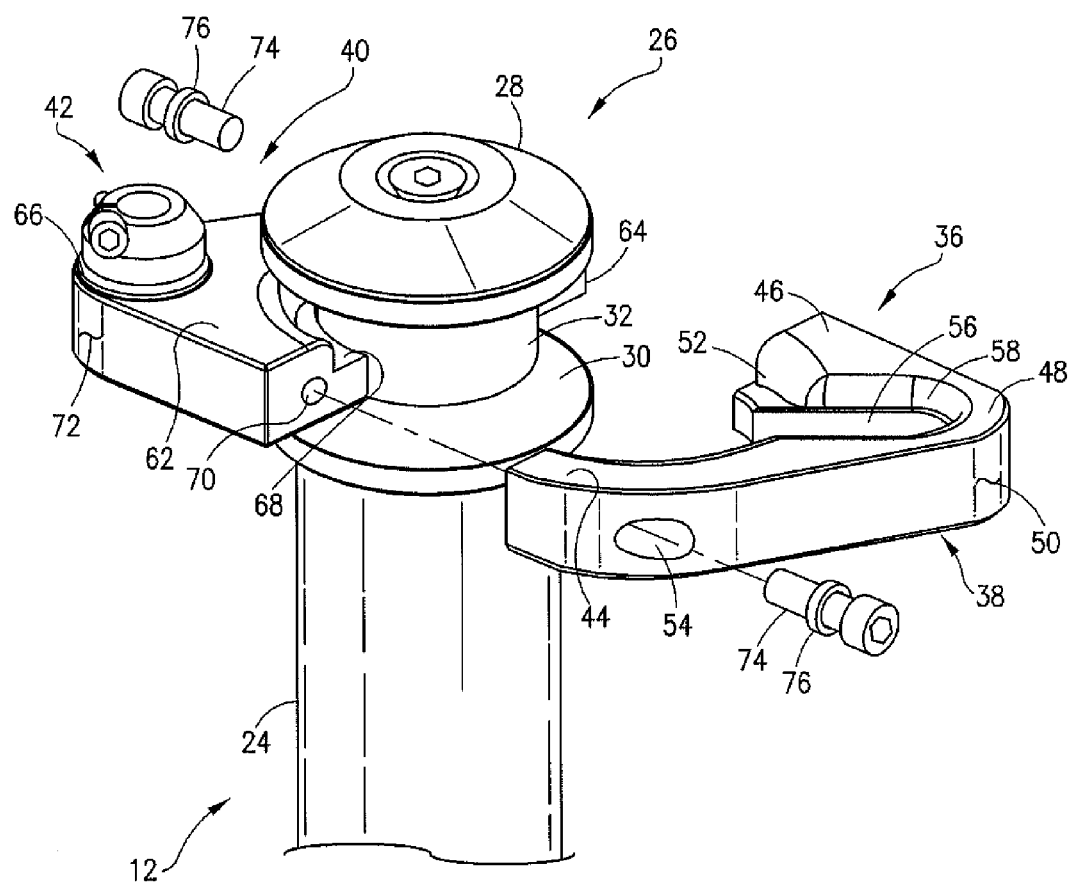
FIG. 2 is an exploded, perspective view of the pylon mount being positioned on a pylon of the ski boat.

With reference to FIG. 2, the pylon 12 is illustrated in more detail. Conventionally, the pylon 12 comprises a post 24 formed of aluminum of similar material which is bolted or otherwise rigidly affixed at the stern of the ski boat 10. An inset 26, preferably formed of nylon or other wear-resistant material, is bolted to the top end of the post 24 of pylon 12. The inset 26 has a head section 28, a skirt section 30 and a neck section 32 extending between the head and skirt sections 28, 30. The neck section 32 has a smaller diameter than both the head and skirt sections 28, 30 to receive the looped end 34 of the ski rope 14. See FIG. 3.

In the presently preferred embodiment, the pylon mount 36 comprises a first clamping section 38, a second clamping section 40 and a lower coupler 42 affixed to the second clamping section 40. The first clamping section 38 is generally U-shaped defining opposed aims 44 and 46 with a center section 48 between them. The arms 44, 46 and center section 48 have an outer surface 50 and a stepped, inner surface 52 that faces the second clamping section 40. The arm 44 is formed with a recessed through bore 54, and the arm 46 is formed with a threaded bore 70, shown in phantom lines in FIG. 9, extending inwardly from the inner surface 52. A ski rope opening 56 is formed in the center section 48 of the first clamping section 38, extending from its inner surface 52 toward the outer surface 50. The ski rope opening 56 defines a wall 58 preferably having a chamfered surface.

For purposes of the present discussion, the terms "upper" and "lower" refer to the vertical orientation of the pylon 12 and pylon mount 36 as depicted in the Figs. The terms "inner" and "outer" denote the relationship of the pylon mount 36 relative to the pylon 12, e.g. the inner surface 52 of the first clamping section 38 is located closest to the pylon 12 whereas its outer surface 50 is spaced from the pylon 12.

The second clamping section 40 of the pylon mount 36 is similar to the first clamping section 38. It is generally U-shaped with opposed arms 62 and 64 and a center section 66 between them. The arm 62, beginning at the stepped inner surface 68 of the second clamping section 40, is formed with a threaded bore 70. A recessed through bore 54 is formed in the arm 64 of the second clamping section 40, as shown in phantom lines in FIG. 9. The lower coupler 42 is mounted near the outer surface 72 of the second clamping section 40, in the position depicted in FIG. 2.

The first and second clamping sections 38, 40 are connected to one another and pivotally mounted to the inset 26 by placing their respective inner surfaces 52, 68 adjacent to the neck section 22 of the inset 26 and then inserting a clamp bolt 74 having a lock washer 76 through the recessed through bore 54 in the arm 44 of the first clamping section 38 and into the threaded bore 70 in the arm 62 of the second clamping section 40 where it is tightened down. The same connection is made with a second clamp bolt 74 and lock washer 76 between the opposite arms 46 and 64 of the first and second clamping sections 38, 40, respectively. The ski rope 14 may be is extended from the neck section 22 of the pylon 12 through the ski rope opening 56 in the first clamping section 38 in position to contact the wall 58 formed by such opening 56.

Figure 3:
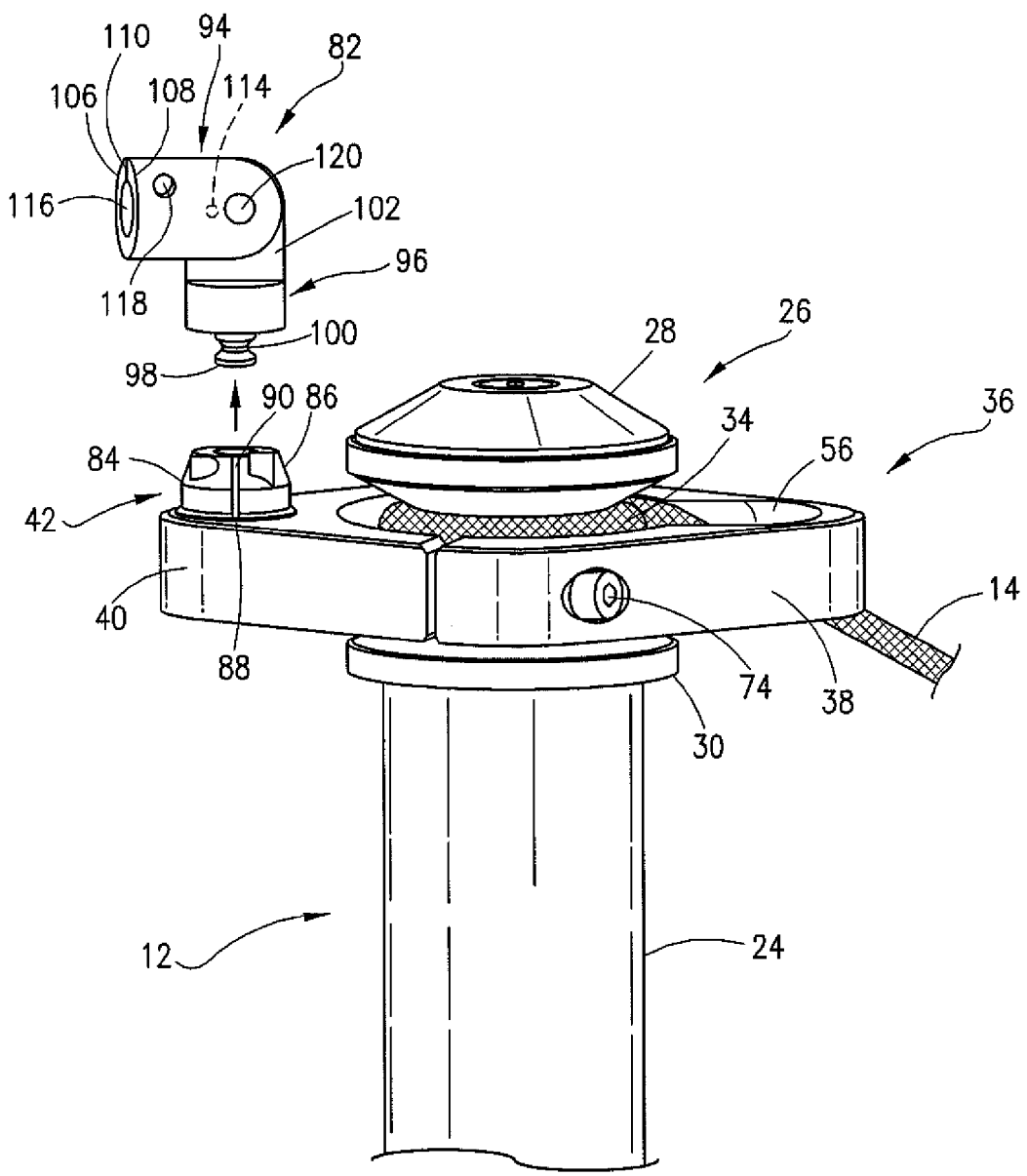
FIG. 3 is a perspective view of the assembled pylon mount with an upper coupler in position to connect to a lower coupler located on such mount.
Figure 9:
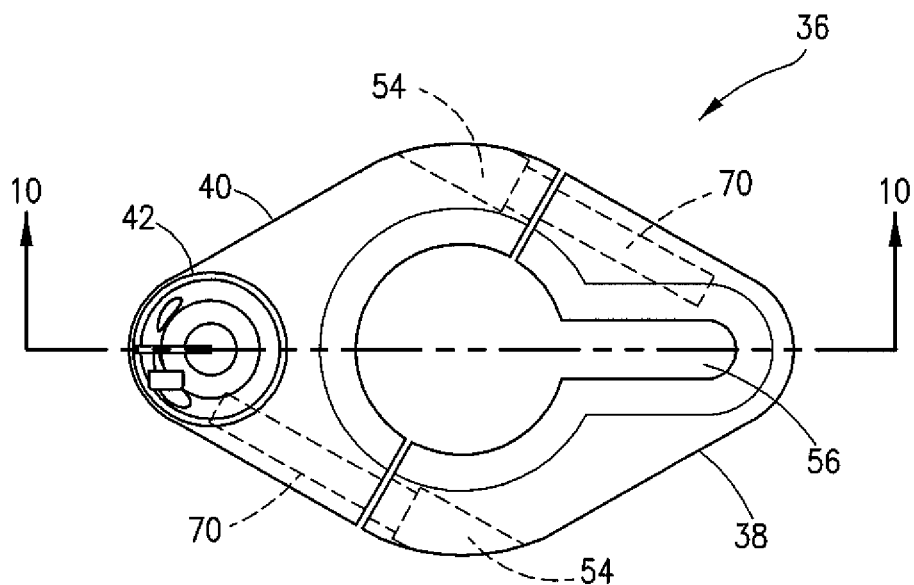
FIG. 9 is a plan view of the assembled pylon mount.
Figure 10:
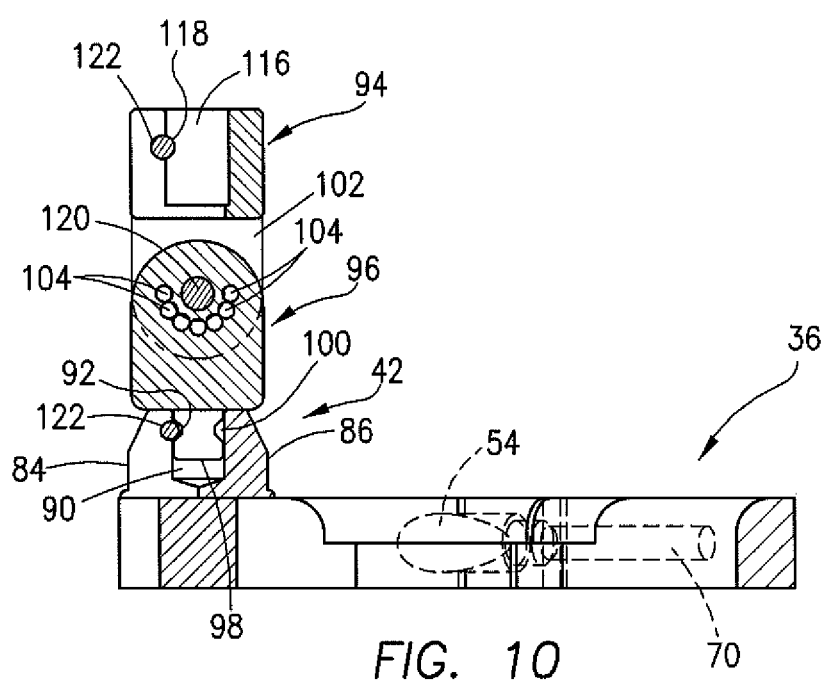
FIG. 10 is a cross sectional view taken generally along line 10-10 of FIG. 9.

Referring now to FIGS. 3-5, 9 and 10, in one embodiment the pylon mount 36 is employed with a cradle 78 to mount a smart phone 80. The cradle 78 is connected to the pylon mount 36 by an upper coupler 82 which is received by and mounted to the lower coupler 42. As best seen in FIGS. 3, 9 and 10, the lower coupler 42 is preferably formed with a first half section 84 and a second half section 86 which are at least partially separated from one another by a slot 88. A first bore 90 is partially formed in each of the first and second half sections 84, 86, and a second, cross bore 92 is formed in each of the first and second half sections 84, 86 which intersects the first bore 90. The cross bore 92 is threaded in one of the first and second half sections 84, 86.

The upper coupler 82 may be formed in two parts, namely, an upper leg 94 and a lower leg 96. The lower leg 96 includes an extension 98 having a circumferentially extending recess 100, and a generally planar surface 102 formed with a number of blind bores 104. The upper leg 94 includes two half sections 106, 108 at least partially separated by a slot 110, and a generally planar surface having an anti-rotation pin 114 shown in phantom in FIG. 3. A first bore 116 is partially formed in each of the half sections 106, 108, and a second, cross bore 118 is formed in each of the first and second half sections 106, 108 which intersects the first bore 116. The cross bore 118 is threaded in one of the first and second half sections 106, 108. The upper and lower legs 94, 96 of the upper coupler 82 are connected to one another by inserting the pin 114 on the upper leg 94 into one of the blind bores 104 in the lower leg 96 with their respective planar surfaces in abutment with one another. A bolt 120 connects the upper and lower legs 94, 96 together. It should be understood that upper and lower legs 94, 96 may be oriented at various angles relative to one another, depending upon which blind bore 104 of the lower leg 96 receives the pin 114 on the upper leg 94, and the approximately 90° orientation shown in the Figs. is for purposes of illustration only.

In order to connect the upper coupler 82 to the lower coupler 42, the extension 98 on the lower leg 96 of the upper coupler 82 is extended into the first bore 90 of the lower coupler 42. A fastener 122 is inserted into the cross bore 92 in the lower coupler 42, so that it extends into the recess 100 of extension 98, and then the fastener 122 is tightened down.

Figure 4:
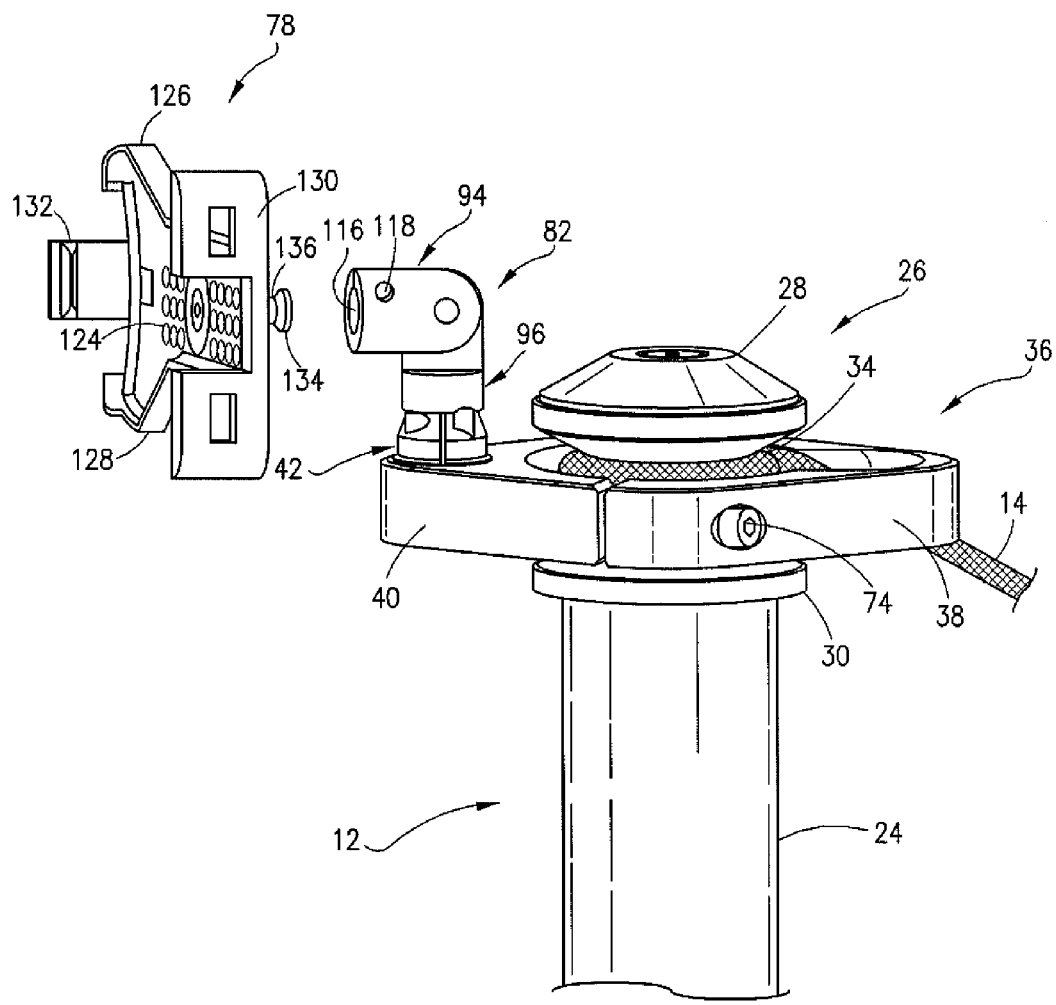
FIG. 4 is a view similar to FIG. 3, except with the upper coupler connected to the lower coupler and a cradle positioned to connect to the upper coupler.
Figure 5:
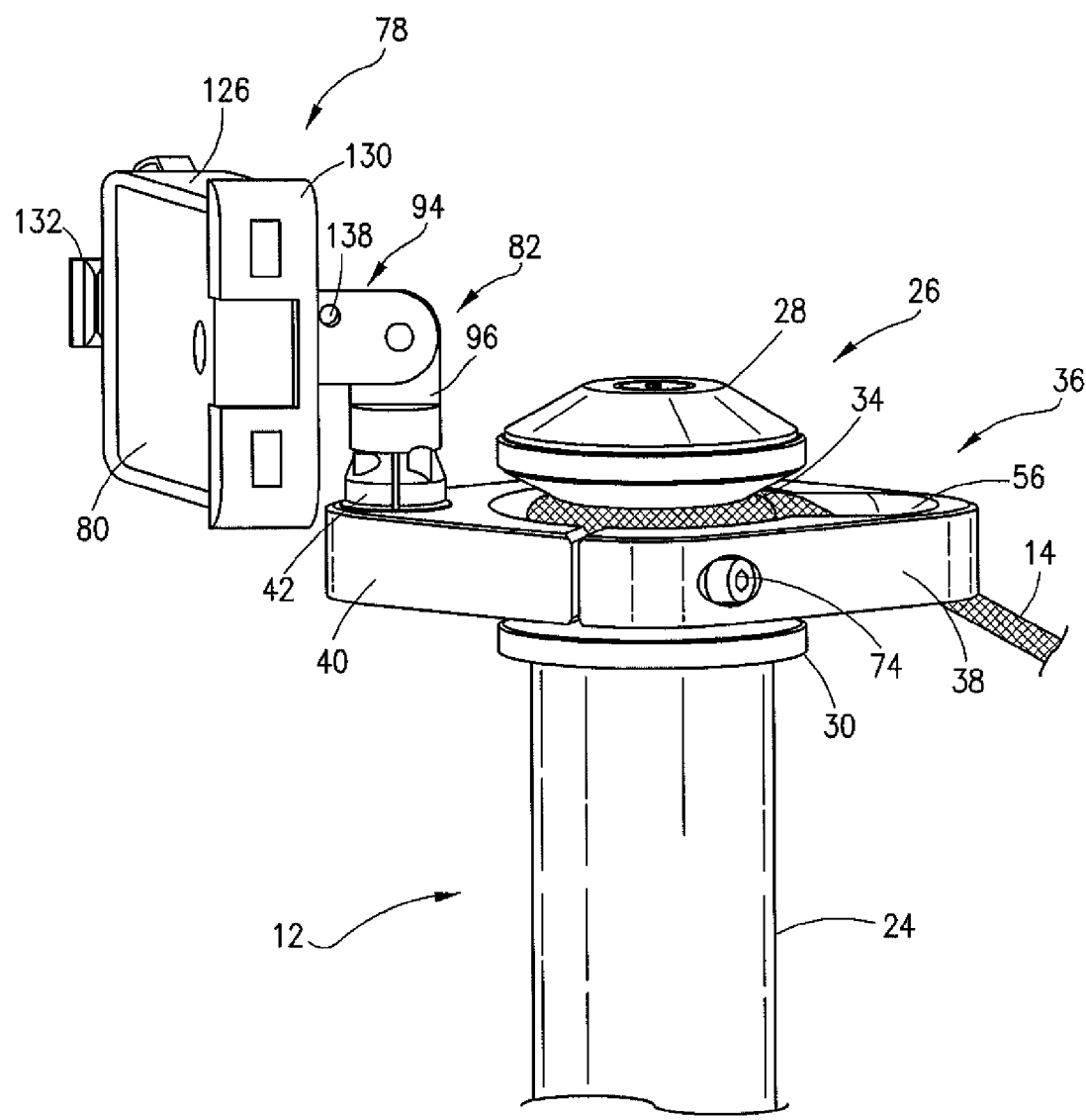
FIG. 5 is a view similar to FIG. 4 depicting the cradle connected to the upper coupler and a smart phone mounted in the cradle.

As best seen in FIG. 4, the cradle 78 is formed with a base 124, opposed side walls 126, 128, a front wall 130 and a back wall 132 which collectively receive and mount a smart phone 80 or similar portable device having video recording capability. An extension 134 having a circumferential recess 136 extends outwardly from the base 124 for insertion into the first bore 116 of the upper coupler 82. The cradle 78 is secured to the upper coupler 82 by inserting a fastener 138 into cross bore 118, so that it extends into the recess 136 of extension 134, and then the fastener 138 is tightened down.

Figure 6:
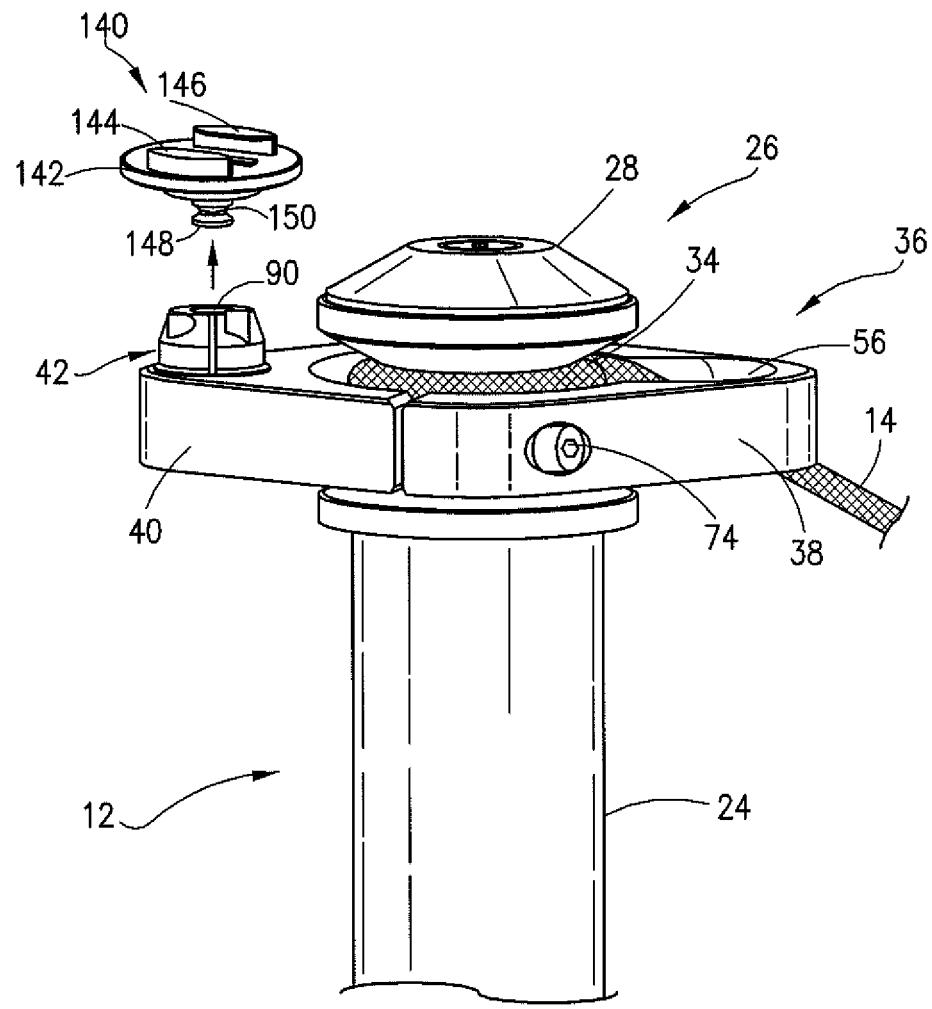
FIG. 6 is a perspective view similar to FIG. 3, except depicting an alternative embodiment in which a camera mount is located in position to connect to the lower coupler.
Figure 7:
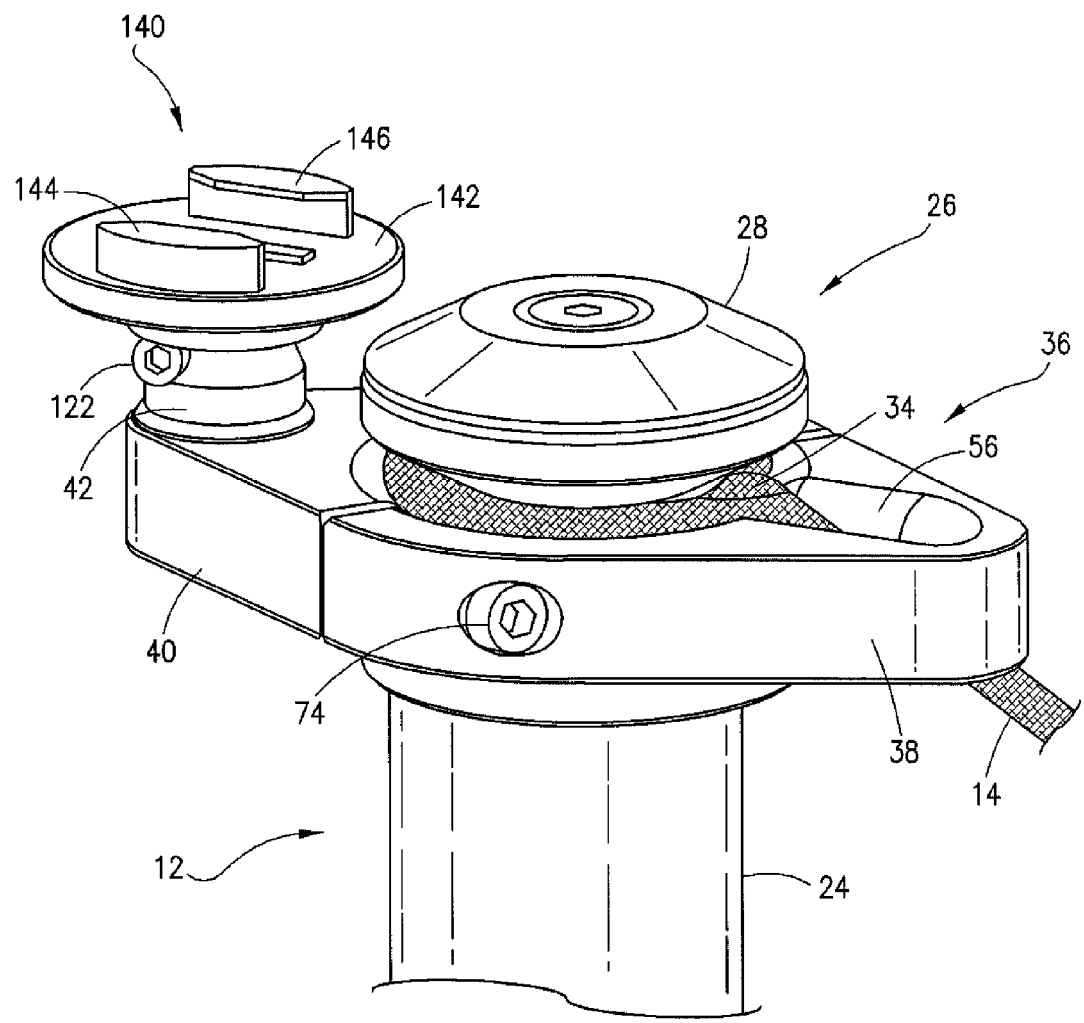
FIG. 7 is a view similar to FIG. 6 illustrating the camera mount connected to the lower coupler.
Figure 8:
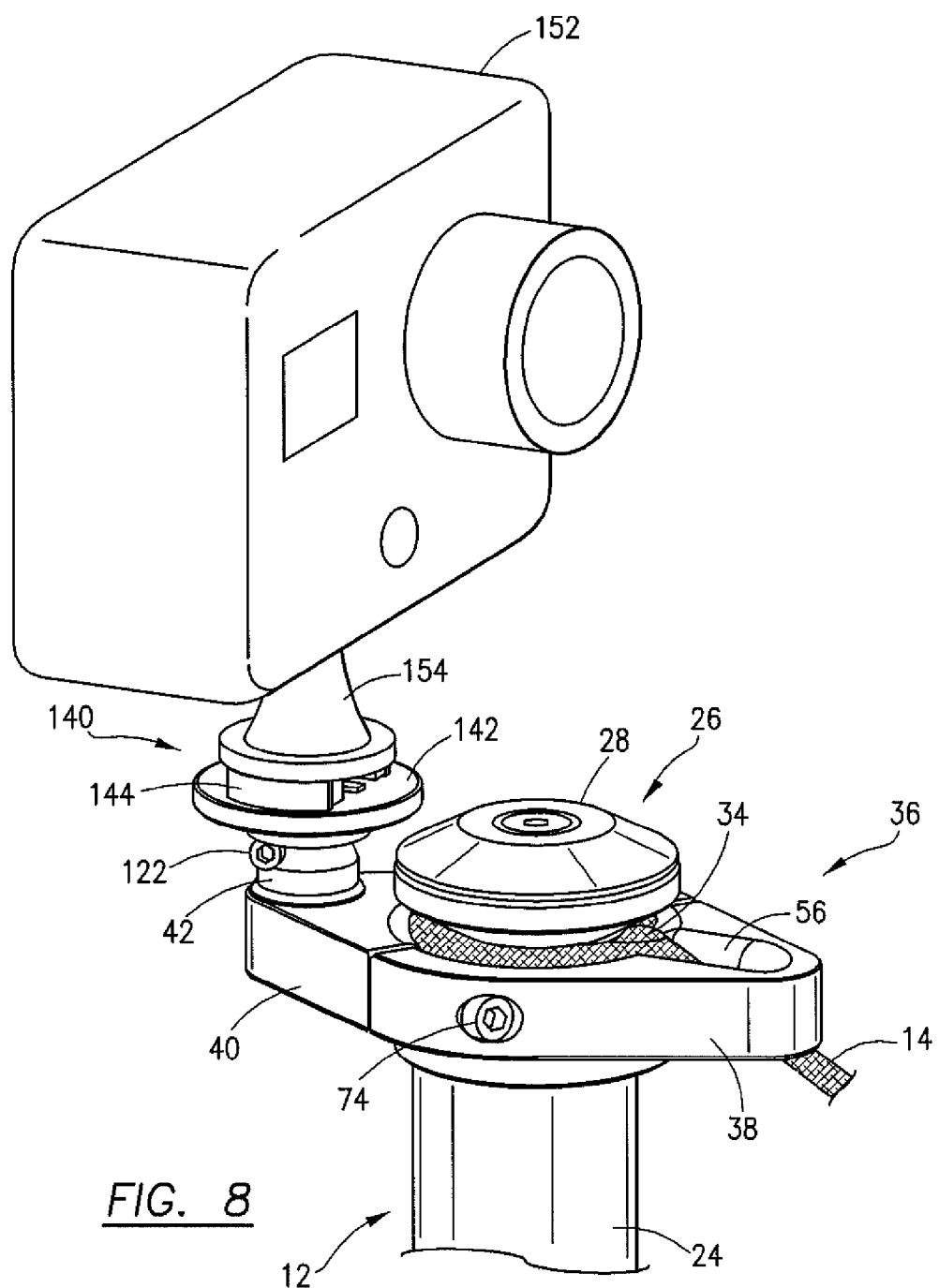
FIG. 8 is a view similar to FIG. 7 showing a camera attached to the camera mount.

Referring now to FIGS. 6-8, the pylon mount 36 of this invention may be employed with another version of a video device mount, e.g. a camera mount 140 of the type, for example, commercially available from Woodman Labs, Inc. of Half Moon Bay, Calif. under the name and mark "GOPRO®". The camera mount 140 may be formed with a base plate 142 having an upper surface that mounts a pair of spaced locking arms 144, 146, and a lower surface. An extension 148 having a circumferential recess 150 projects from the lower surface of base plate 142. In order to connect the camera mount 140 to the lower coupler 42, its extension 148 is received within the first bore 90 of the lower coupler 42. A fastener 122 is inserted into the cross bore 92 in the lower coupler 42, so that it extends along the recess 150 of extension 148, and then the fastener 122 is tightened down. A camera 152, schematically depicted in FIG. 8, may be releasably fixed to the camera mount 140 by inserting a pedestal 154 located at the bottom of the camera 152 between the locking arms 144, 146 on the camera mount 140.

The pylon mount 36 of this invention provides an efficient, easy-to-install an effective means of creating a video of a skier 18 during a skiing run. The first and second clamping sections 38, 40 of the pylon mount 36 are easily pivotally mounted coupled to the inset 16 of the pylon 12 by tightening down two clamp bolts 74 as described above. Depending on the type of video recording device to be used, e.g. a video camera, smart phone or other portable device, a cradle 78, camera mount 140 or other video device mounting may be quickly and easily secured to the pylon mount 36 by tightening a single fastener 122 to the lower coupler 42, and, in the case of the camera mount 140, a second fastener 122 to the upper coupler 82.

Because the ski rope 14 extends through the ski rope opening 56 in the pylon mount 36, as the skier 18 moves from side-to-side during a skiing run the ski rope 14 engages the wall 58 of the ski rope opening 56 causing the pylon mount 36 to follow. In turn, the smart phone 80 or camera 152 track the motion of the skier 18 so that he or she is always centered in the frame of the video without the need for someone on the ski boat 10 to manipulate the video recording device in any way.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. Apparatus for mounting a video recording device to the pylon of a water ski boat, comprising:
   a pylon mount including a first clamping section and a second clamping section, said first clamping section being formed with a rope guide opening and said second clamping section having a first coupler, said first and second clamping sections being connected to one another so that they each extend around a portion of the pylon in position for a ski rope to extend from the pylon through said rope guide opening so that the first and second clamping sections pivot around said portion of the pylon
   a video device mount releasably connected to said first coupler, said video device mount being adapted to mount a video recording device in position to face in a direction toward the stern of the water ski boat,
   said pylon mount and said video device mount being movable as a unit in response to contact between the ski rope and said first clamping section of said pylon mount within said rope guide opening, whereby a video recording device mounted to said pylon mount tracks the movement of a skier grasping the ski rope during the course of a skiing run.

2. The apparatus of claim 1 in which said video device mount is a cradle formed to mount a smart phone.

3. The apparatus of claim 1 in which said video device mount is a camera mount which supports a video camera.

4. The apparatus of claim 1 in which said first coupler includes a first half section at least partially separated from a second half section by a slot, a first bore partially formed in each of said first and second half sections, and a second bore partially formed in each of said first and second half sections which intersects said first bore.

5. The apparatus of claim 4 further including:
   (i) a second coupler having first and second end portions, said first end portion being formed with an extension having at least one recess, said extension of said second coupler being insertable into said first bore of said first coupler;
   (ii) a fastener insertable into said second bore of said first coupler and extending along at least a portion of said at least one recess in said extension of said first end portion of said second coupler, said fastener being tightened down within said second bore;
   (iii) said second end portion of said second coupler being formed with a first half section at least partially separated from a second half section by a slot, a first bore partially formed in each of said first and second half sections, and a second bore partially formed in each of said first and second half sections which intersects said first bore.

6. The apparatus of claim 5 in which said video device mount is a cradle including a base formed with an extension having a recess, said extension of said cradle being inserted into said first bore of said second end portion of said second coupler, a fastener being insertable into said second bore of said second end portion of said second coupler and extending along at least a portion of said at least one recess in said extension of said cradle, said fastener being tightened down within said second bore in said second end portion of said second coupler.

7. The apparatus of claim 4 in which said video device mount is a camera mount formed with an extension having at least one recess, said extension being insertable within said first bore in said first coupler, a fastener being inserted within said second bore of said first coupler and along at least a portion of said at least one recess in said extension of said camera mount, said fastener being tightened down within said second bore of said first coupler.

8. Apparatus for mounting a video recording device to a water ski boat, comprising:
   a pylon having a head section, a skirt section and a neck section extending between said head and skirt sections, said pylon being adapted to mount to the water ski boat;
   a pylon mount including a first clamping section and a second clamping section, said first clamping section being formed with a rope guide opening and said second clamping section having a first coupler, said first and second clamping sections being connected to one another so that they each extend around said neck portion of said pylon in position for a ski rope to extend from said pylon through said rope guide opening so that the first and second clamping sections pivot around said neck portion
   a video device mount releasably connected to said first coupler, said video device mount being adapted to mount a video recording device in position to face in a direction toward the stern of the water ski boat,
   said pylon mount and said video device mount being movable as a unit in response to contact between the ski rope and said first clamping section within said rope guide opening, whereby a video recording device mounted to said pylon mount tracks the movement of a skier grasping the ski rope during the course of a skiing run.

9. The apparatus of claim 8 in which said rope guide opening forms a wall in said first clamping section, said ski rope engaging different locations along said wall in response to movement of a skier during a ski run causing said pylon mount and said video recording device mounted thereto to move in the same direction as the skier.

10. The apparatus of claim 9 in which said video device mount is a cradle formed to mount a smartphone.

11. The apparatus of claim 9 in which said video device mount is a camera mount adapted formed to mount a video camera.

12. The apparatus of claim 9 in which said first coupler includes a first half section at least partially separated from a second half section by a slot, a first bore partially formed in each of said first and second half sections, and a second bore partially formed in each of said first and second half sections which intersects said first bore.

13. The apparatus of claim 12 further including:
   (i) a second coupler having first and second end portions, said first end portion being formed with an extension having at least one recess, said extension of said second coupler being insertable into said first bore of said first coupler;
   (ii) a fastener insertable into said second bore of said first coupler and extending along at least a portion of said at least one recess in said extension of said first end portion of said second coupler, said fastener being tightened down within said second bore;
   (iii) said second end portion of said second coupler being formed with a first half section at least partially separated from a second half section by a slot, a first bore partially formed in each of said first and second half sections, and a second bore partially formed in each of said first and second half sections which intersects said first bore.

14. The apparatus of claim 13 in which said video device mount is a cradle including a base formed with an extension having a recess, said extension of said cradle being inserted into said first bore of said second end portion of said second coupler, a fastener being insertable into said second bore of said second end portion of said second coupler and extending along at least a portion of said at least one recess in said extension of said cradle, said fastener being tightened down within said second bore in said second end portion of said second coupler.

15. The apparatus of claim 12 in which said video device mount is a camera mount formed with an extension having at least one recess, said extension being insertable within said first bore in said first coupler, a fastener being inserted within said second bore of said first coupler and along at least a portion of said at least one recess in said extension of said camera mount, said fastener being tightened down within said second bore of said first coupler.

* * * * *